Jan. 18, 1955    J. J. KOTTE    2,699,937
FEED MECHANISM FOR PERFORATED SOUND FILMS
Filed April 23, 1949

INVENTOR.
JAN JACOB KOTTE
BY
AGENT

United States Patent Office 2,699,937
Patented Jan. 18, 1955

2,699,937

FEED MECHANISM FOR PERFORATED SOUND FILMS

Jan Jacob Kotte, Eindhoven, Netherlands, assignor to Hartford National Bank and Trust Company, Hartford, Conn., as trustee Application April 23, 1949, Serial No. 89,248

Claims priority, application Netherlands May 11, 1948

3 Claims. (Cl. 271—2.3)

This invention relates to feed mechanisms for perforated sound films comprising a plain roller (referred to hereinafter as the sound roller) which is continuously driven by the film and over which the film is guided along the exposure area provided at the circumference of the sound roller, and further comprising a guide roller arranged in front of the sound roller in relation to the direction of movement of the film, one or more guide rollers arranged behind the sound roller in relation to the said direction, and a toothed driving roller by which the film is continuously moved. Such feed mechanisms must satisfy the requirement not only that the film movement along the exposure area should be as continuous and as smooth as possible, but also that the film should be guided in such manner that during transport it invariably engages the surface of the sound roller over a sufficiently large part thereof. Efforts have been made in various ways to find a solution to this problem, but none of the known devices gives a completely satisfactory result.

In such a known device it has been endeavoured to achieve the aforesaid object by braking the film at the guide roller arranged in front of the sound roller with the use of a braking device. The braking force exerted on the film is such that a tension of about 500 g's prevails in the part of the film located between the sound roller and the driving roller, so that the film is kept taut over the various rollers. Owing to the great film tension such a device ensures during transport accurate engagement of the film on the circumference of the sound roller, so that movement of the film at right angles to the film surface, the so-called "breathing" of the film, is avoided but the high film tension causes the shocks inevitably produced by the engagement of the teeth of the driving roller in the perforations of the film to be transmitted, on account of the taut film, to the portion in contact with the sound roller, so that only one of the aforesaid requirements is fulfilled. In order to reduce the action of the shocks in the film at the scanning point on the sound roller, one of the guide rollers behind the sound roller is, as a rule, mounted resiliently. Thus, the shocks in the film will be reduced by the resilient motion of the guide roller. However, since, owing to the high film tension, the equilibrium of the resiliently-arranged guide roller requires a comparatively heavy resilient construction of the said roller, comparatively great mass and frictional forces must be overcome to ensure the movement of the guide roller required for the elimination of the shocks, so that the object aimed at cannot be reached with the use of the said construction.

In a further known device of the said kind attempts have been made to find a solution for the difficulties by reducing the film tension. For this purpose the braking device at the guide roller arranged before the sound roller is removed, the guide roller being provided with a spring by which it is urged against the circumference of the sound roller, so that at this area a satisfactory contact between film and sound roller is ensured. In contradistinction to the known device of the first-mentioned kind the film must be movable as freely as possible and the pressure roller as well as the sound roller are provided with ball bearings, so that the tension in the part of the film between the sound roller and the driving roller may be materially smaller than in the known device of the first-mentioned kind, the tension being about 40 g's. In order to avoid slip between the film and the sound roller due to the low film tension, provision is made of adequate friction between the film and the sound roller. For this purpose the contact surface between the sound roller and the film is, on the one hand, chosen to be as large as possible by arranging the guide roller behind the sound roller (in relation to the direction of movement) on the side of the film remote from the sound roller in such manner that the area where the film leaves the sound roller is located in the proximity of the area at which the film runs on to the sound roller, whereas on the other hand the pressure roller produces the required contact pressure. Since, in order to ensure constant movement of the sound roller is, as a rule, coupled with a fly-wheel, the tension in the film part behind the sound roller required for starting the fly-wheel will initially be higher than the aforesaid value which refers only to the operative condition. When applying the said measure, shocks in the film can be minimised, since the low film tension gives rise to slack in the film, so that shocks in the film, instead of being transmitted to the sound roller, are neutralised by the slack of the film, since practically no mass and frictional forces need by overcome. However, as will be set out more fully hereinafter, the film will tend to "breathe" in the part extending round the sound roller, so that the requirements of perfect film guidance cannot thus be fulfilled. In the last-mentioned device there are two causes of "breathing" of the film in the part extending round the sound roller. Firstly, if a film is curved over a roller at low tension, the part of the film between the points where it runs on to and leaves the roller will lift away from the roller, on account of the film rigidity. However, since in the said device the part of the film running on to the sound roller is urged by the pressure roller against the sound roller and since the resilient guide roller is arranged in such manner that the film is in contact with the largest possible part, for example, more than half the circumference of the sound roller, the film will tend on account of its rigidity, to bend away from the roller circumference exactly at the centre of the part extending round the sound roller. The tendency of the film to move at right angles with respect to the roller surface is augmented by any vibrations of the film which, owing to the described arrangement of the resilient guide roller, occur in the part of the film leaving the sound roller and located directly behind it, in the direction of the length of the film, i. e. in a direction tangential to the sound roller. Consequently, the scanning light beam in reproducing apparatus and the recording beam in recording apparatus, which beams are, as a rule, approximately at the centre of the part of the film engaging the circumference of the sound roller, is not focussed accurately on the film, which results in distortion of the sound to be reproduced or to be recorded.

In order to obviate the disadvantages of the aforesaid known device, the part of the film between the sound roller and the driving roller in the device according to the invention is solely guided by one or more guide rollers, rotatable about fixed axes and provided on the same side of the film as the sound roller in such manner that this part of the film has a curved shape. Owing to the absence of a braking device, the film tension may be kept low, as in the known devices of the last-mentioned kind, so that shocks produced by the engagement of the teeth of the driving roller in the perforations of the film are compensated in that part of the film located between the sound roller and the driving roller.

Owing to the particular arrangement of the guide rollers behind the sound roller it is possible to achieve elimination of the tendency of the film to lift away from the circumference of the roller in the central part of the loop of the film extending round the sound roller, since the said arrangement permits shocks in the part of the film located immediately behind the sound roller to produce vibrations at right angles to the film surface. By thus facilitating the occurrence of vibrations in the film at an area where this has no detrimental effect, viz. solely in the part of the film located immediately behind the sound roller, such vibrations are prevented from propagating into the part of the film extending round the sound roller.

The arrangement of the guide rollers in the device according to the invention furthermore results in that the rigidity of the film, which have a harmful effect in the last-mentioned known device, are on the contrary advantageous in the device according to the invention, since the part of the film between the sound roller and the subsequent guide roller will readily bend out and thus contribute to the part extending round the sound roller remaining throughout its length in contact with the surface of the sound roller.

In order that the invention may be more clearly understood and readily carried into effect, reference will now be had to the accompanying diagrammatic drawing, in which.

For the sake of simplicity, corresponding parts in all the figures are designated by the same reference numerals.

Figure 1:
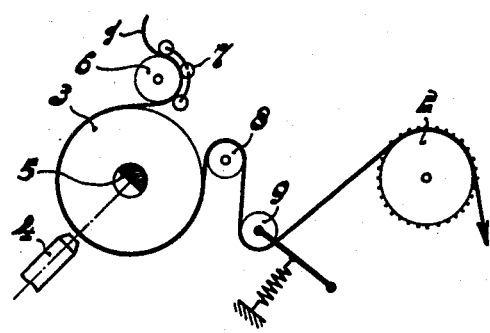
Fig. 1 shows a feed mechanism of the type which in the known devices comprising a braking device arranged before the sound roller is used for scanning a sound track provided on a film.

A perforated sound film 1 is driven at uniform speed by a toothed driving roller 2. Before the film 1 reaches the driving roller 2, it is guided over a plain sound roller 3, at the circumference of which is arranged an optical system 4 producing a beam of light. The sound roller is mounted on ball bearings and is driven solely by the film. The sound roller 3 is hollow and arranged inside it is a photo-electric cell 5 by which variations in the intensity of the light beam modulated by the sound record are connected into variations in electric current. In relation to the direction of the movement of the film, the sound roller 3 has arranged in front of it a guide roller 6, which is provided with a braking device 7. Arranged between the sound roller and the driving roller 2 are further guide rollers 8 and 9, of which the latter is arranged resiliently. In order to ensure a satisfactory contact between sound roller and film, the braking force exerted on the film is adjusted to be such that the film tension is approximately 500 g's. Thus, the part of the film between the sound roller and the driving roller is kept taut, so that shocks in the film produced by the engagement of the teeth of the driving roller in the film perforations are transmitted to that part of the film extending round the sound roller, which has a harmful effect on the quality of the sound to be reproduced or to be recorded. As said before, owing to the magnitude of the film tension, the effect of the resilient guide roller 9 can be only slight on account of the comparatively heavy construction which is required for the resilient support.

Figure 2:
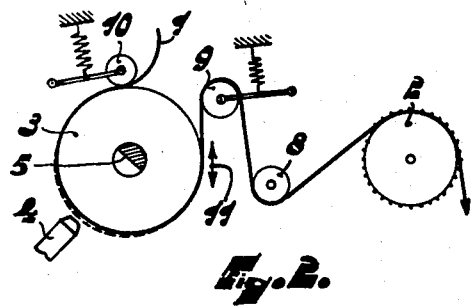
Fig. 2 shows a known device without a braking device and comprising a pressure roller arranged at the circumference of the sound roller.

In the device shown in Fig. 2, the sound roller 3 has arranged on it in a position in front of the scanning point in relation to the direction of motion, a pressure roller 10, subject to spring pressure, by which the film is urged against the sound roller. The film is in this case not braked, and the frictional forces occurring are reduced to a minimum by providing the pressure roller 10 and the sound roller 3 with ball bearings. In order to make the film engage the maximum portion of the circumference of the sound roller to avoid slip of the film, it is guided over a guide roller 9, which is resiliently arranged in the proximity of the sound roller between the sound roller and the driving roller and engages the face of the film opposite to the sound roller, the film forming a S-shaped loop. If necessary, the film is furthermore guided over a fixed guide roller 8, in order to ensure that the film engages a sufficient number of teeth of the driving roller. The shocks occurring in the film are compensated as far as possible by the resilient movement of the guide roller 9, since only small momenta and frictional forces of the spindles occur. However, it is unavoidable that the part of the film immediately behind the sound roller is still subject to vibrations in the direction of its length as indicated by the arrow 11. These vibrations contribute to the film lifting from the surface of the sound roller, the more so as the part of the film located between the points at which the film runs on to and leaves the sound roller, tends to lift away from the roller surface owing to the film rigidity, as has been set out before for the case in which the film tension is small. Consequently, the film at the scanning device will move up and down at right angles to the surface of the sound roller (as indicated by a dotted line) so that correct focussing of the scanning device becomes impossible, which results in that a certain amount of blurring, more particularly at high frequencies, becomes apparent during reproduction.

Figure 3:
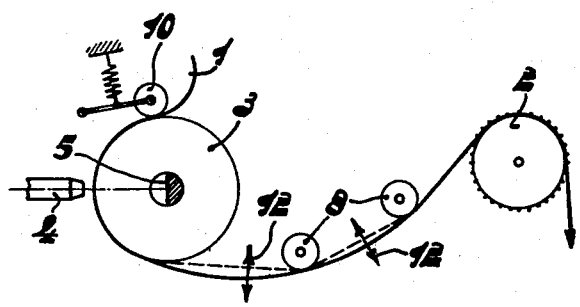
Fig. 3 shows a mechanism according to the invention.

In the feed mechanism according to the invention shown in Fig. 3, this disadvantage is obviated in that two fixed guide rollers 8 are arranged, on the same side of the film as the sound roller, between the driving roller 2 and the sound roller 3 in such manner that this part of the film, as viewed from the sound roller, shows a concave form. Any shocks still occurring in the film are now able to produce, in the part of the film immediately behind the sound roller, vibrations at right angles to the direction of movement of the film, as indicated by arrows 12. The particular arrangement of the guide rollers 8 contribute to the curvature of the part of the film between the sound roller and the guide rollers 8, so that the film portion extending over the sound roller will engage the surface thereof throughout. In Fig. 3, the angle through which the film is in contact with the sound roller is smaller than that in Fig. 2, so that there is a smaller contact surface between film and roller in Fig. 3, but the rigidity of the film guarantees continuous contact with the surface of the roller between the points at which the film runs on to and leaves the roller, so that on the one hand, as compared with the known device, the frictional surface is not reduced or substantially not reduced since the film in the said known device at the centre of the curved portion has no satisfactory contact with the roller surface and, on the other hand, the important advantage is obtained that the film remains in contact with the sound roller at the area of operation of the scanning device. It is evident that these conditions are controllable by the choice of the degree of curvature of the curved part of the film.

What I claim is:

1. A feed mechanism for perforated sound films comprising: a plain sound roller adapted to be continuously driven by a sound film moved thereon, means for scanning the film moved on said sound roller in an exposure area provided at the circumference thereof, a toothed driving roller positioned for pulling the film from said plain sound roller; and means for guiding the pulled film along said exposure area at said sound roller circumference and along circumferential regions adjacent both sides of said exposure area, said means comprising: a first pressure roller urging the film against said sound roller and positioned ahead of said exposure area of said sound roller in relation to the direction of movement of the pulled film, and a guide roller positioned beyond said sound roller in the direction of movement of the pulled film and on the same side of the film as is said sound roller, said guide roller being rotatable about a fixed axis and located in the film path between said sound roller and said toothed driving roller so as to receive film directly from the circumference of said sound roller and to curve the film in a concave loop with respect to the position of the film in relation to the sound roller.

2. A feed mechanism for perforated sound films comprising: a plain sound roller adapted to be continuously driven by a sound film moved thereon, means for scanning the film moved on said sound roller in an exposure area provided at the circumference thereof, a toothed driving roller positioned on the side of the film opposite to that engaging the surface of said sound roller for pulling the film from said plain sound roller; and means for guiding the pulled film along said exposure area at said sound roller circumference and along circumferential regions adjacent both sides of said exposure area, said means comprising: a pressure roller urging the film against said sound roller and positioned ahead of the exposure area of said sound roller in relation to the direction of movement of the pulled film, and guide means positioned beyond said sound roller in the direction of movement of the pulled film and on the same side of the film as is said sound roller, said guide means comprising a roller rotatable about a fixed axis and located in the film path between said sound roller and said toothed driving roller so as to receive film directly from the circumference of said sound roller and to curve the film so that the center of curvature thereof lies on the same side of the film as said sound roller.

3. A feed mechanism for perforated sound films comprising: a plain sound roller adapted to be continuously driven by a sound film moved thereon, means for scanning the film moved on said sound roller in an exposure area provided at the circumference thereof, a toothed driving roller positioned for pulling the film from said plain sound roller; and means for guiding the pulled film along said exposure area at said sound roller circumference and along circumferential regions adjacent both sides of said exposure area, said means comprising: a pressure roller positioned ahead of the exposure area of said sound roller in relation to the direction of movement of the pulled film, means biasing said pressure roller toward engagement with said sound roller circumference, and a pair of spaced guide rollers positioned beyond said sound roller in the direction of movement of the pulled film and both on the same side of the film as is said sound roller, said guide rollers being rotatable about fixed axes and located in the film path between said sound roller and said toothed driving roller so as to receive film directly from the circumference of said sound roller and to curve the film in said path in a concave loop with respect to said sound roller and in the same general direction as does said sound roller.

References Cited in the file of this patent

UNITED STATES PATENTS

| | | |
|---|---|---|
| Re. 19,270 | Kellogg | Aug. 14, 1934 |
| 2,013,109 | Reynolds | Sept. 3, 1935 |
| 2,210,372 | Kolb | Aug. 6, 1940 |
| 2,248,106 | McNabb | July 8, 1941 |
| 2,442,400 | Collins | June 1, 1948 |
| 2,528,184 | Schwayder | Oct. 31, 1950 |

FOREIGN PATENTS

| | | |
|---|---|---|
| 383,060 | Great Britain | Nov. 10, 1932 |
| 549,315 | Great Britain | Nov. 16, 1942 |
| 748,871 | France | July 12, 1933 |